United States Patent
Yoshida et al.

(10) Patent No.: US 10,731,499 B2
(45) Date of Patent: Aug. 4, 2020

(54) SEAL DEVICE FOR TURBINE, TURBINE, AND THIN PLATE FOR SEAL DEVICE

(71) Applicant: MITSUBISHI HITACHI POWER SYSTEMS, LTD., Kanagawa (JP)

(72) Inventors: Azumi Yoshida, Tokyo (JP); Hidekazu Uehara, Tokyo (JP); Hiroharu Oyama, Kanagawa (JP); Kohei Ozaki, Tokyo (JP); Katsuhisa Hamada, Yokohama (JP); Hideaki Sugishita, Tokyo (JP); Toyoharu Nishikawa, Tokyo (JP); Yoshihiro Kuwamura, Tokyo (JP); Kohei Hatano, Tokyo (JP); Keisuke Matsuyama, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 128 days.

(21) Appl. No.: 15/551,383

(22) PCT Filed: Dec. 22, 2015

(86) PCT No.: PCT/JP2015/085741
§ 371 (c)(1),
(2) Date: Aug. 16, 2017

(87) PCT Pub. No.: WO2016/132646
PCT Pub. Date: Aug. 25, 2016

(65) Prior Publication Data
US 2018/0030845 A1 Feb. 1, 2018

(30) Foreign Application Priority Data

Feb. 20, 2015 (JP) .................................. 2015-031943

(51) Int. Cl.
*F01D 11/12* (2006.01)
*F16J 15/447* (2006.01)
(Continued)

(52) U.S. Cl.
CPC ............ *F01D 11/12* (2013.01); *F01D 11/001* (2013.01); *F16J 15/22* (2013.01); *F16J 15/3288* (2013.01);
(Continued)

(58) Field of Classification Search
CPC ......... F01D 11/12; F01D 11/001; F16J 15/22; F16J 15/3288; F16J 15/3292;
(Continued)

(56) References Cited

U.S. PATENT DOCUMENTS 4,767,266 A * 8/1988 Holz ....................... F01D 11/08
277/412
6,343,792 B1 * 2/2002 Shinohara ............. F01D 11/001
277/345

(Continued)

FOREIGN PATENT DOCUMENTS

| CN | 1573023 | 2/2005 |
| CN | 1573024 | 2/2005 |

(Continued)

OTHER PUBLICATIONS

Extended European Search Report dated Feb. 12, 2018 in European Application No. 15882747.7.
(Continued)

*Primary Examiner* — Hung Q Nguyen
*Assistant Examiner* — Susan E Scharpf
(74) *Attorney, Agent, or Firm* — Wenderoth, Lind & Ponack, L.L.P.

(57) ABSTRACT

A seal device for a turbine is disposed around a rotor so as to separate a high-pressure space and a low-pressure space and includes: a plurality of thin plates arranged along an outer peripheral surface of the rotor. Each of the thin plates has a thin-plate tip surface facing the outer peripheral surface of the rotor; a first side plate disposed so as to face (Continued)

the high-pressure space and covering outer peripheral regions of first side surfaces; and a second side plate disposed so as to face the low-pressure space and covering outer peripheral regions of second side surfaces. The first side surface of each of the thin plates is covered with the first side plate in a region extending further to an inner side, in a radial direction of the rotor, than a region of the second side surface covered with the second side plate.

16 Claims, 9 Drawing Sheets

(51) Int. Cl.
*F16J 15/22* (2006.01)
*F01D 11/00* (2006.01)
*F16J 15/3292* (2016.01)
*F16J 15/3288* (2016.01)

(52) U.S. Cl.
CPC ......... *F16J 15/3292* (2013.01); *F16J 15/447* (2013.01); *F16J 15/4472* (2013.01); *F05D 2220/32* (2013.01); *F05D 2240/56* (2013.01); *F05D 2240/59* (2013.01); *F05D 2250/13* (2013.01); *F05D 2250/131* (2013.01); *F05D 2250/182* (2013.01); *F05D 2250/184* (2013.01); *F05D 2250/232* (2013.01); *F05D 2260/30* (2013.01)

(58) Field of Classification Search
CPC .. F16J 15/447; F16J 15/4472; F05D 2220/32; F05D 2240/56; F05D 2240/59; F05D 2250/13; F05D 2250/131; F05D 2250/182; F05D 2250/184; F05D 2250/232; F05D 2260/30
USPC ....................................................... 415/174.2
See application file for complete search history.

(56) References Cited

U.S. PATENT DOCUMENTS

| | | | |
|---|---|---|---|
| 7,226,053 B2 | 6/2007 | Nakano et al. | |
| 7,364,165 B2 | 4/2008 | Nakano et al. | |
| 7,743,498 B2* | 6/2010 | Rhodes | F16J 15/3288 148/516 |
| 8,205,889 B2* | 6/2012 | Verma | F01D 11/12 277/303 |
| 8,231,340 B2 | 7/2012 | Howes | |
| 9,677,410 B2 | 6/2017 | Shinohara et al. | |
| 2004/0256810 A1* | 12/2004 | Nakano | F16J 15/3292 277/402 |
| 2005/0194745 A1* | 9/2005 | Hogg | F16J 15/3292 277/301 |
| 2006/0033285 A1* | 2/2006 | Nishimoto | F16J 15/3292 277/355 |
| 2007/0085277 A1* | 4/2007 | Rhodes | F01D 11/001 277/355 |
| 2008/0007008 A1* | 1/2008 | Hoebel | F01D 11/001 277/355 |
| 2008/0048399 A1 | 2/2008 | Nicholson et al. | |
| 2008/0099999 A1* | 5/2008 | Williams | F16J 15/3292 277/355 |
| 2011/0135453 A1* | 6/2011 | Howes | F01D 11/00 415/171.1 |
| 2012/0007317 A1* | 1/2012 | Beeck | F01D 11/02 277/411 |
| 2013/0043658 A1 | 2/2013 | Zheng et al. | |
| 2013/0154199 A1 | 6/2013 | Williams | |
| 2013/0234397 A1 | 9/2013 | Uehara et al. | |
| 2015/0001805 A1 | 1/2015 | Franceschini | |
| 2016/0010751 A1 | 1/2016 | Uehara et al. | |

FOREIGN PATENT DOCUMENTS

| | | | |
|---|---|---|---|
| CN | 103270250 | 8/2013 | |
| EP | 2 532 838 | 12/2012 | |
| EP | 2 818 769 | 12/2014 | |
| EP | 2818769 | * 12/2014 | ........... F16J 15/3292 |
| JP | 2002-013647 | 1/2002 | |
| JP | 2005-002995 | 1/2005 | |
| JP | 2008-509369 | 3/2008 | |
| JP | 2013-185652 | 9/2013 | |
| WO | 00/03164 | 1/2000 | |
| WO | 2014/129371 | 8/2014 | |

OTHER PUBLICATIONS

First Office Action dated May 22, 2018 in Chinese Patent Application No. 201580076383.3, with Machine Translation.
International Preliminary Report on Patentability dated Aug. 31, 2017 in International Application No. PCT/JP2015/085741, with English-language translation.
Office Action dated Sep. 1, 2017 in Japanese Patent Application No. 2015-031943, with English-language translation.
International Search Report dated Apr. 5, 2016 in International Application No. PCT/JP2015/085741, with English-language translation.
Office Action dated Jan. 24, 2019 in Chinese Patent Application No. 201580076383.3 with Machine Translation.
Office Action dated Jan. 4, 2019 in European Patent Application No. 15882747.7.
Office Action dated Jun. 24, 2019 in corresponding European Patent Application No. 15882747.7.
Examination Report dated Dec. 16, 2019 in India Patent Application No. 201717029098.

* cited by examiner

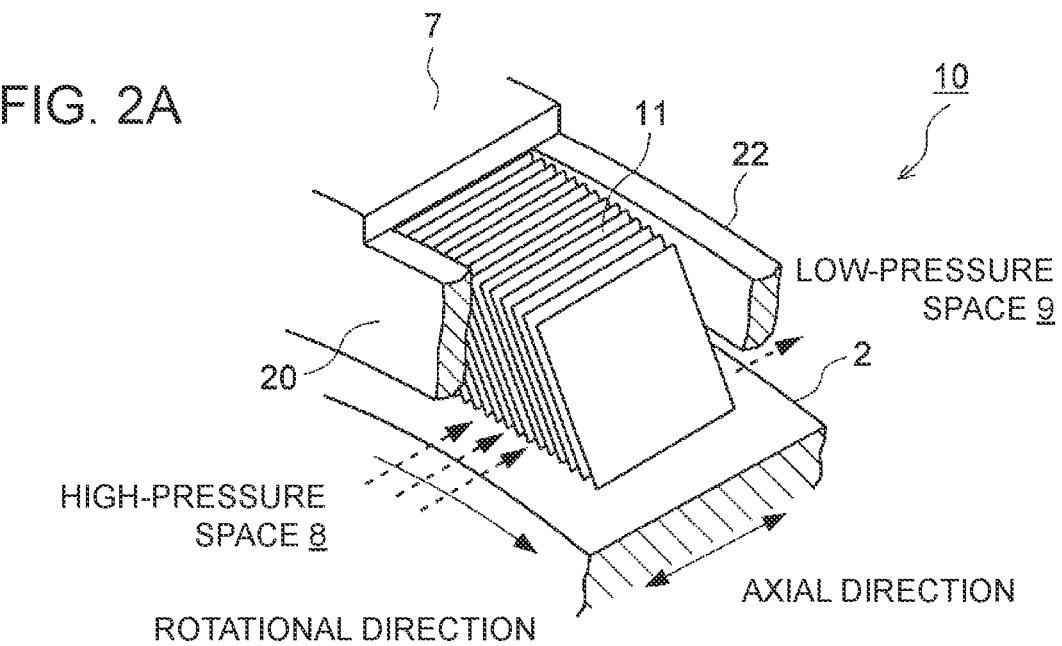
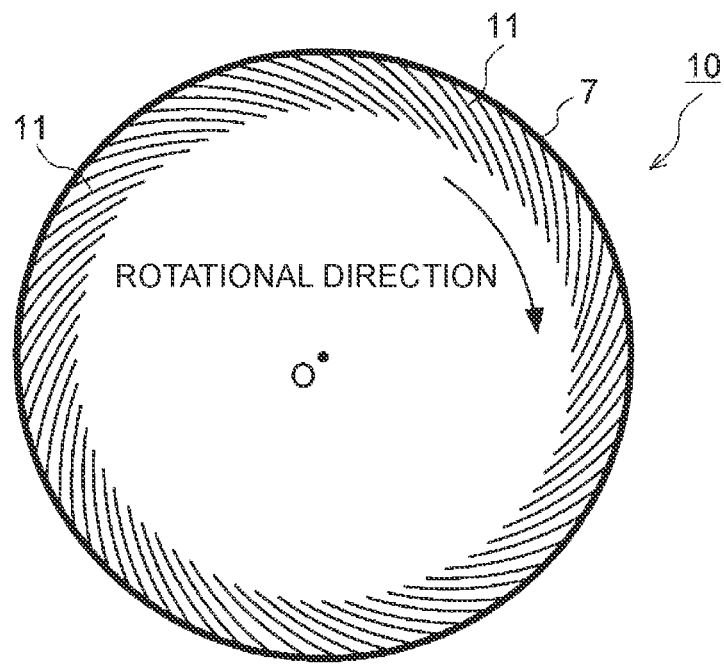

HIGH-PRESSURE SPACE 8

LOW-PRESSURE SPACE 9

AXIAL DIRECTION

RADIAL DIRECTION

HIGH-PRESSURE SPACE 8

LOW-PRESSURE SPACE 9

AXIAL DIRECTION

ROTATIONAL DIRECTION

HIGH-PRESSURE SPACE 8

LOW-PRESSURE SPACE 9

AXIAL DIRECTION

AXIAL DIRECTION

SEAL DEVICE FOR TURBINE, TURBINE, AND THIN PLATE FOR SEAL DEVICE

TECHNICAL FIELD

The present disclosure relates to a seal device for a turbine, a turbine, and a thin plate for a seal device.

BACKGROUND ART

Generally, in a turbine such as a gas turbine and a steam turbine, a seal device for reducing a leakage amount of a fluid that flows from the high-pressure side toward the low-pressure side is disposed between the outer peripheral surface of a rotor and a stator.

As a type of such seal device, known is a thin-plate seal structure having a plurality of thin plates (leafs) arranged in the circumferential direction of the rotor in a multiple-layered fashion, as disclosed in Patent Documents 1 to 3. The thin plates are normally in contact with the rotor while the turbine is stopped, but the thin-plate tip portions levitate from the rotor peripheral surface while the turbine is in operation, so that the thin plates are mainly in a non-contact state with the rotor. As compared to the labyrinth structure, the thin-plate seal structure is advantageous in that the leakage amount of fluid is small thanks to smaller clearance, as well as that abrasion of thin plates is less likely to occur thanks to the thin plates being in the non-contact state with the rotor more often in time series, thus having a longer seal lifetime.

Furthermore, with regard to the thin-plate seal structure, Patent Documents 1 to 3 disclose a configuration in which a low-pressure side plate and a high-pressure side plate are disposed on both sides, respectively, of the thin plates in the direction of the rotational axis of the rotor.

In Patent Document 1, the low-pressure side plate and the high-pressure side plate are used as guide plates in a direction in which a pressure of a fluid is applied. In Patent Documents 2 and 3, the low-pressure side plate and the high-pressure side plate are used mainly to form an appropriate static pressure distribution around the thin plates. That is, during operation of a turbine, the high-pressure side plate is in close contact with the side surfaces of the thin plates due to a pressure difference between the upstream side and the downstream side, so that the gap between the thin plates is closed in most section on the side of the thin-plate root portions (stator side). Thus, the fluid flows through the gap between the rotor peripheral surface and the rotor-side end portion of the high-pressure side plate, that is, from the side of the thin-plate tip portions (rotor side), into the gap between the thin plates. The fluid having flown into the gap between the thin plates from the side of the thin-plate tip portions forms an upward flow that flows from the thin-plate tip portions toward the root portions, and flows out from the gap between the rotor peripheral surface and the rotor-side end portion of the low-pressure side plate. The thin plates are disposed inclined with respect to the peripheral surface of the rotor. Thus, the thin-plate tip portions levitate due to the static pressure distribution formed by the upward flow of the fluid in the gap between the thin plates, and the thin plates separate from the rotor. Furthermore, besides the effect of the static pressure distribution, the dynamic pressure effect from rotation of the rotor also causes each thin plate to levitate.

CITATION LIST

Patent Literature

Patent Document 1: WO2000/003164A
Patent Document 2: JP2002-13647A
Patent Document 3: 2005-2995A

SUMMARY

Problems to be Solved

Meanwhile, the thin-plate seal structure has following problems.

For instance, the thin-plates have a cantilever structure, in which the thin plates are supported on the stator at their root portions, while tip portions are free ends, and a fluid flows around the thin plates, which may cause oscillation of the thin plates due to flutter.

With regard to this problem, Patent Documents 1 to 3 do not disclose any specific measure for suppressing oscillation due to flutter.

Another problem is that, during operation of a turbine, the thin-plate tip portions may make contact with the rotor excessively to cause abrasion or breakage if the non-contact state between the thin plates and the rotor is not established appropriately.

That is, as mentioned in Patent Documents 2 and 3, to realize a state in which the thin-plate tip portions are levitated from the rotor peripheral surface, it is necessary to apply a flow of a fluid in a direction to push up rotor-side surfaces of the thin plates that are inclined with respect to the rotor peripheral surface. However, if an appropriate static-pressure distribution is not formed in the gap between the thin plates, the thin-plate tip portions are rather pushed against the rotor peripheral surface, thus making contact with the rotor, which may lead to abrasion or breakage of the thin-plate tip portions.

In view of the above, an object of at least one embodiment of the present invention is to provide a seal device for a turbine, a turbine, and a thin plate for a seal device, capable of suppressing oscillation due to flutter of thin plates (leafs) effectively while appropriately realizing the non-contact state of the thin plates with the rotor.

Solution to the Problems (1) A seal device for a turbine according to at least one embodiment of the present invention is disposed around a rotor so as to separate a high-pressure space and a low-pressure space, and comprises: a plurality of thin plates arranged along an outer peripheral surface of the rotor, each of the thin plates having a thin-plate tip surface facing the outer peripheral surface of the rotor; a first side plate disposed so as to face the high-pressure space and covering outer peripheral regions of first side surfaces, on a side of the high-pressure space, of the plurality of thin plates; and a second side plate disposed so as to face the low-pressure space and covering outer peripheral regions of second side surfaces, on a side of the low-pressure space, of the plurality of thin plates. The first side surface of each of the thin plates is covered with the first side plate in a region extending further to an inner side, in a radial direction of the rotor, than a region of the second side surface covered with the second side plate. A radial-directional position of the thin-plate tip surface of each of the thin plates has such a distribution that the side of the high-pressure space is farther away from the outer peripheral surface of the rotor than the side of the low-pressure space in at least a partial range of the thin-plate tip surface in an axial direction of the rotor, and the radial-directional position of the thin-plate tip surface at an axial-directional position closest to the high-pressure space is positioned on an inner side of an inner peripheral edge of the first side plate in the radial direction.

With the above configuration (1), the first side surface of each thin plate on the side of the high-pressure space is covered with the first side plate, and the second side surface of each thin plate on the side of the low-pressure space is covered with the second side plate. The first side surface is covered with the first side plate over a region extending further to the inner side in the radial direction of the rotor than a region of the second side surface covered with the second side plate. With the above configuration, an upward flow flowing from the end portion on the side of the rotor of the thin plate toward the end portion on the side of the stator is formed in the gap between the thin plates, and it is possible to form a suitable static-pressure distribution for causing the thin plates to levitate from the outer peripheral surface of the rotor. Thus, it is possible to maintain a non-contact state stably between the rotor and the thin plates.

Furthermore, the radial-directional position of the thin-plate tip surface of each thin plate has such a distribution that the side of the high-pressure space is more away from the outer peripheral surface of the rotor than the side of the low-pressure space, in the axial direction of the rotor. Further, the radial-directional position of the thin-plate tip surface at the axial-directional position closest to the high-pressure space is disposed on the inner side, in the radial direction, of the inner peripheral edge of the first side plate. With this configuration, the flow rate of the above described upward flow on the side of the high-pressure space increases, and the gap between the thin plates on the side of the low-pressure space becomes relatively narrow. Thus, distortion of the thin plates due to the upward flow increases, and contact between the thin plates on the side of the low-pressure space accompanying the distortion is likely to occur. When being in contact with one another as described above, the thin plates support one another, and thereby it is possible to suppress oscillation of the thin plates due to flutter. Furthermore, it is possible to form the space between the outer peripheral surface of the rotor and the thin-plate tip surface appropriately, and to suppress oscillation due to flutter while maintaining the shaft seal effect.

(2) In some embodiments, in the above configuration (1), a distance between the thin-plate tip surface and the outer peripheral surface of the rotor decreases from the side of the high-pressure space toward the side of the low-pressure space in the axial direction of the rotor.

With the above configuration (2), by improving the shape of the thin-plate tip surface to adjust the distribution of the distance between the thin-plate tip surface and the outer peripheral surface of the rotor, it is possible to fine-adjust the distortion amount of the thin plates. Thus, it is possible to make the thin plates contact with each other appropriately.

(3) In some embodiments, in the above configuration (1) or (2), the thin-plate tip surface is such an inclined surface that the side of the high-pressure space is farther away from the outer peripheral surface of the rotor than the side of the low-pressure space, in the axial direction of the rotor.

With the above configuration (3), the thin-plate tip surface can be machined easily.

(4) In some embodiments, in the above configuration (1), the thin-plate tip surface includes such a step that the side of the high-pressure space is farther away from the outer peripheral surface of the rotor than the side of the low-pressure space, in the axial direction of the rotor.

With the above configuration (4), the thin-plate tip surface is formed by the step, and thus the thin-plate can be machined easily. Furthermore, in the flow direction, the clearance between the rotor peripheral surface and the thin-plate tip surface of the rotor decreases rapidly from the step, and thus it is possible to form the above described upward flow effectively. With the above configuration (4), by adjusting the height of the step of the thin-plate tip surface, it is possible to fine-adjust the distortion amount of the thin plate.

(5) In an embodiment, in the above configuration (4), the step of the thin-plate tip surface is disposed closer to the low-pressure space than a midpoint of the thin plate with respect to a width direction of the thin plate.

With the above configuration (5), on the side of the high-pressure space, it is possible to secure an adequate space between the rotor peripheral surface and the thin-plate tip surface, and thus it is possible to form an upward flow in the gap between the thin plates effectively.

(6) In some embodiments, in any one of the above configurations (1) to (5), the seal device further comprises a retainer configured to hold a side of a root portion of the plurality of thin plates. The first side plate and the second side plate are supported by the retainer while being nipped between the retainer and a corresponding one of both side surfaces of the plurality of thin plates.

(7) In some embodiments, in any one of the above configurations (1) to (6), the thin-plate tip surface of each of the thin plates has the distribution such that the radial-directional position of the thin-plate tip surface is farther away from the outer peripheral surface from the side of the low-pressure space toward the side of the high-pressure space in a first region, on the side of the high-pressure space in the axial direction of the rotor, of the thin-plate tip surface. The thin-plate tip surface of each of the thin plates has the distribution such that the radial-directional position of the thin-plate tip surface is farther away from the outer peripheral surface from the side of the high-pressure space toward the side of the low-pressure space in a second region, on the side of the low-pressure space in the axial direction of the rotor, of the thin-plate tip surface.

With the above configuration (7), in the first region of the thin-plate tip surface on the side of the high-pressure space, the radial-directional position of the thin-plate tip surface has such a distribution that the radial-directional position of the tip surface is farther away from the outer peripheral surface of the rotor from the side of the low-pressure space toward the side of the high-pressure space, which makes it possible to achieve an effect to promote the levitation effect of the thin plate.

Furthermore, in the second region of the thin-plate tip surface on the side of the low-pressure space, the radial-directional position of the thin-plate tip surface has such a distribution that the radial-directional position of the tip surface is farther away from the outer peripheral surface of the rotor from the side of the high-pressure space toward the side of the low-pressure space, which promotes formation of low pressure between the thin plates on the side of the low-pressure space, and creates an effect to push the thin-plate tip surface against the outer peripheral surface of the rotor.

As described above, from the effect to levitate the thin plates in the first region on the side of the high-pressure space and the effect to push the thin plates in the second region on the side of the low-pressure space, it is possible to achieve the effect to levitate the thin plates stably.

(8) In some embodiments, in the above configuration (7), an expression $L_1>L_2$ is satisfied, provided that $L_1$ is a length of the first region in the axial direction of the rotor and $L_2$ is a length of the second region in the axial direction of the rotor.

With the above configuration (8), it is possible to ensure an appropriate balance between the effect to levitate the thin plates in the first region on the side of the high-pressure space and the effect to push the thin plates in the second region on the side of the low-pressure space.

(9) In some embodiments, in the above configuration (7), the thin-plate tip surface of each of the thin plates is configured such that a length $D_1$ of the first region in the radial direction of the rotor is greater than a length $D_2$ of the second region in the radial direction of the rotor.

(10) In some embodiments, in the above configuration (9), an expression $D_1/L_1>D_2/L_2$ is satisfied, provided that $L_1$ is a length of the first region in the axial direction of the rotor, and $L_2$ is a length of the second region in the axial direction of the rotor.

For instance, if the pressure balance between the thin plates is lost and the thin plates are pushed against the outer peripheral surface of the rotor, the above distribution changes on the side of the high-pressure space and on the side of the low-pressure space, along with abrasion of the thin plates. In such a case, with the above configuration (8) or (9), the loss occurs from the second region having a smaller length than the first region in the radial direction of the rotor, and the shape of the thin plates changes to such a shape that a levitation force on the side of the high-pressure space can be easily achieved. Thus, it is possible to prevent development of abrasion of the thin plates.

In the present embodiment, in the above (7) to (10), a steep distribution of the radial-directional position of the thin-plate tip surface that does not contribute to the effect to levitate or push the thin plate is not applied as the first region or the second region. For instance, the first region and the second region may be applied to only a region in which the inclination of the thin-plate tip surface with respect to the axial direction of the rotor is 60° or less.

(11) A turbine according to at least one embodiment of the present invention comprises: a rotor having a turbine blade; and the seal device according to any one of the above (1) to (10) disposed around the rotor so as to separate an annular space around the rotor into a high-pressure space and a low-pressure space.

With the above configuration (11), it is possible to maintain the non-contact state between the rotor and the thin plates stably, which makes it possible to prevent abrasion or breakage of the thin plates and to suppress oscillation of the thin plates due to flutter, thus providing a highly-reliable turbine.

(12) A thin plate for a seal device according to at least one embodiment of the present invention is the thin plate for the seal device according to any one of the above (1) to (10).

Advantageous Effects

According to at least one embodiment of the present invention, it is possible to form an upward flow flowing from the end portion on the side of the rotor of the thin plate toward the end portion on the side of the stator in the gap between the thin plates, and to form a suitable static-pressure distribution for causing the thin plates to levitate from the outer peripheral surface of the rotor. Thus, it is possible to maintain a non-contact state stably between the rotor and the thin plates.

Furthermore, the flow rate of the above described upward flow on the side of the high-pressure space increases, and the gap between the thin plates on the side of the low-pressure space becomes relatively narrow, and the thin plates are more likely to be in contact with each other on the side of the low-pressure space accompanying distortion of the thin plates due to the upward flow. Accordingly, it is possible to suppress oscillation of the thin plate due to flutter.

BRIEF DESCRIPTION OF DRAWINGS

FIG. 2A is a perspective view schematically showing a seal device according to some embodiments. FIG. 2B is a diagram schematically showing a layout of thin plates in a seal device.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

Figure 1:
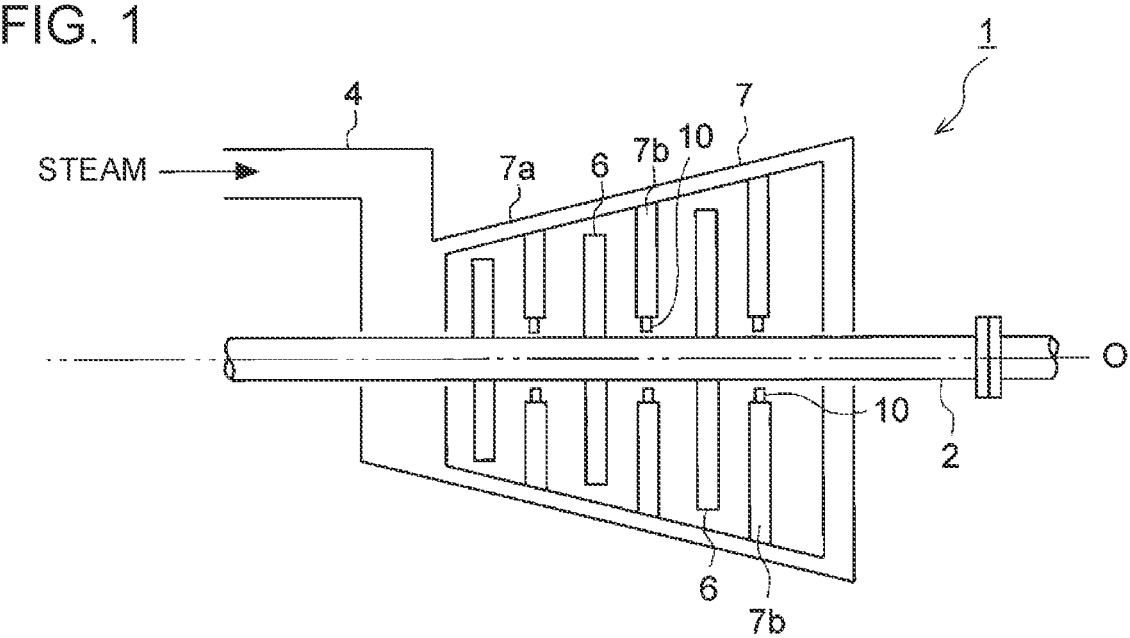
FIG. 1 is a schematic configuration diagram of a steam turbine according to some embodiments.

First, the steam turbine 1 shown in FIG. 1 will be described as an example of a turbine according to the present embodiment. FIG. 1 is a schematic configuration diagram of a steam turbine 1 according to some embodiments.

As shown in FIG. 1, the steam turbine 1 according to some embodiments is configured to rotary drive the rotor 2 with steam introduced into a casing 7a from a steam inlet 4. In the drawing, the steam discharging mechanism such as an exhaust chamber is not shown.

Specifically, the steam turbine 1 includes a plurality of rotor blades 6 disposed on the side of the rotor 2, a stator (stationary part) 7 including a casing 7a and a plurality of stationary vanes 7b disposed on the side of the casing 7a, and seal devices 10 disposed on the tips of the stationary vanes 7b.

The plurality of rotor blades 6 and the plurality of stationary vanes 7b are arranged alternately in the direction of the rotational axis O of the rotor 2 (hereinafter, referred to as the axial direction). The rotor 2 rotates as the steam flowing along the axial direction passes through the rotor blades 6 and the stationary vanes 7b, and rotational energy imparted to the rotor 2 is extracted from the end of the shaft to be utilized for power generation or the like.

Next, with reference to FIGS. 2 to 8, a specific configuration of the seal device 10 according to some embodiments will be described.

Figure 3A:
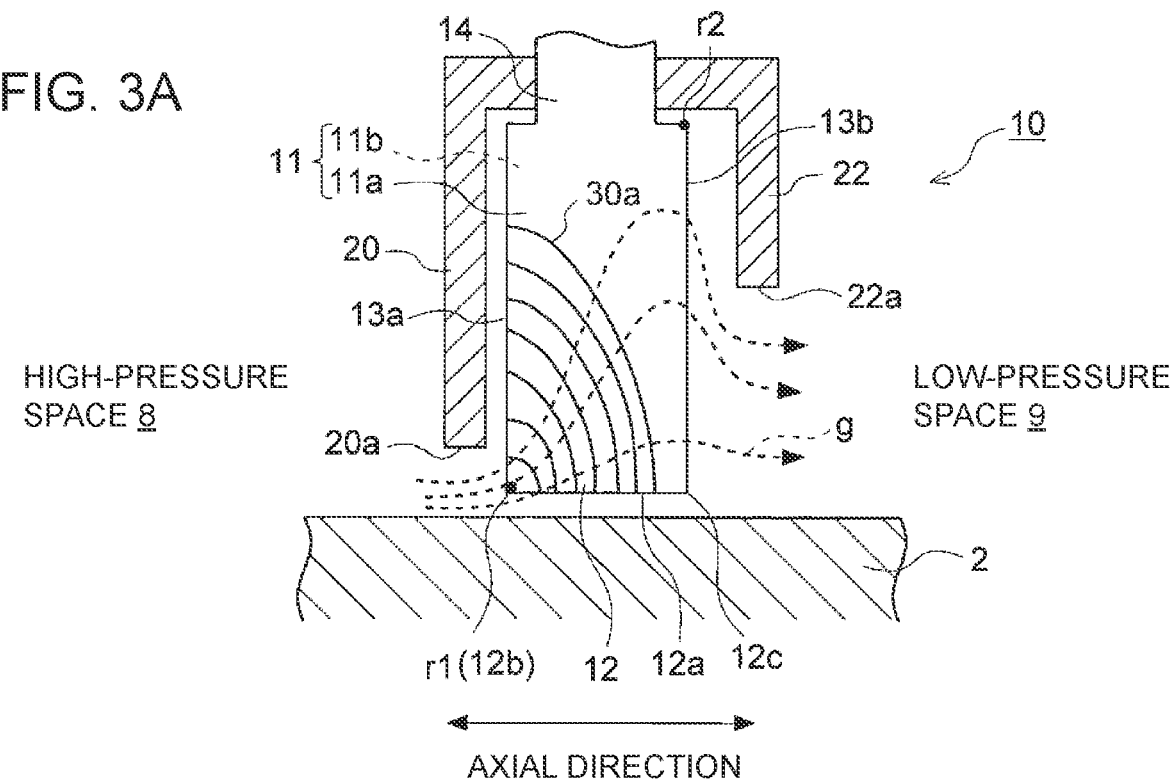
FIG. 3A is a diagram showing a static-pressure distribution in a gap between thin plates according to an embodiment.
Figure 3B:
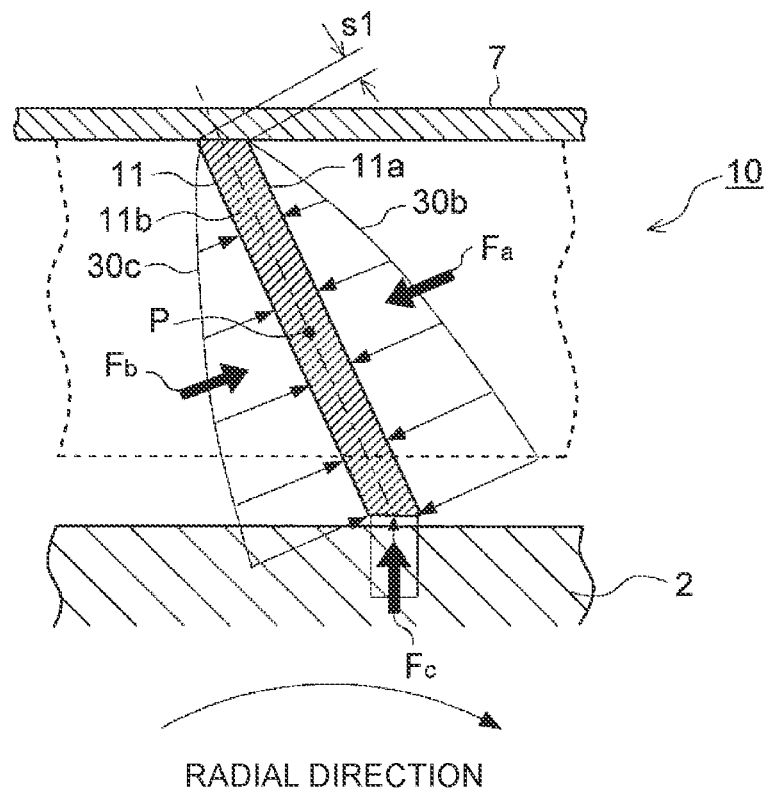
FIG. 3B is a cross-sectional view for describing the operation of a thin plate, taken in a direction perpendicular to the rotational axis of a rotor.

FIG. 2A is a perspective view schematically showing the seal device 10 according to some embodiments. FIG. 2B is a diagram schematically showing a layout of thin plates 11 in the seal device 10. FIG. 3A is a diagram showing a static-pressure distribution in a gap between the thin plates 11 according to an embodiment. FIG. 3B is a cross-sectional view for describing the operation of a thin plate 11, taken in a direction perpendicular to the rotational axis O of the rotor 2. FIGS. 4 to 7 are configuration diagrams of the seal device 10 according to respective embodiments. FIG. 8 is a diagram for describing the interval of the thin plates 11.

As shown in FIGS. 2 to 7, the seal device 10 according to the present embodiment is disposed around the rotor 2 so as to separate the high-pressure space 8 and the low-pressure space 9, and configured to reduce the leakage amount of fluid (steam) that leaks from the high-pressure space 8 to the low-pressure space 9. The seal device 10 has a thin-plate seal structure having a plurality of thin plates (leafs) 11 arranged in the circumferential direction of the rotor 2 in a multiple-layered fashion.

In some embodiments, the seal device 10 includes a plurality of thin plates 11 arranged along the outer peripheral surface of the rotor 2, a first side plate 20 disposed so as to face the high-pressure space 8, and a second side plate 22 disposed so as to face the low-pressure space 9.

Specifically, the plurality of thin plates 11 are disposed inside an annular space between the rotor 2 and the stator 7, and arranged in the circumferential direction of the rotor 2 in a multiple-layered fashion, separated from one another via a minute space. The plurality of thin plates 11 are disposed on the substantially same width-directional position with respect to the axial direction of the rotor 2.

Each thin plate 11 is flexible, fixed to the stator 7 at the side of a root portion 14 and having a tip portion 12 being a free end on the side of the rotor 2. Each thin plate 11 is disposed so as to be inclined to form an acute angle with the outer peripheral surface of the rotor 2 in the circumferential direction. That is, each thin plate 11 is disposed so as to be inclined to form an angle of more than zero degree with respect to the radial direction of the rotor 2. While the steam turbine 1 is stopped (the rotor 2 is stopped), the tip portion 12 of each thin plate 11 is in contact with the outer peripheral surface of the rotor 2.

The first side plate 20 is an annular thin plate disposed so as to face the high-pressure space 8, and is formed so as to cover an outer-peripheral region (a region on the side of the root portion 14) of the first side surface 13a of each of the plurality of thin plates 11, the first side surface 13a being disposed on the side of the high-pressure space 8.

The second side plate 22 is an annular thin plate disposed so as to face the low-pressure space 9, and is formed so as to cover an outer-peripheral region (a region on the side of the root portion 14) of the second side surface 13b of each of the plurality of thin plates 11, the side surface 13b being disposed on the side of the low-pressure space 9.

In the present embodiment, the outer-peripheral side refers to the outer side of the rotor 2 in the radial direction.

The first side surface 13a of each thin plate 11 is covered with the first side plate 20 over a region extending further to the inner side in the radial direction of the rotor 2 than a region of the second side surface 13b covered with the second side plate 22. Specifically, the distance between the outer peripheral surface of the rotor 2 and the inner peripheral edge 20a of the first side plate 20 (end portion on the side of the rotor 2) is smaller than the distance between the outer peripheral surface of the rotor 2 and the inner peripheral edge 22a of the second side plate 22 (end portion on the side of the rotor 2).

With this configuration, an upward flow flowing from the end portion on the side of the rotor 2 of the thin plate 11 toward the end portion on the side of the stator 7 is formed in the gap between the thin plates 11, and it is possible to form a suitable static-pressure distribution for causing the thin plates 11 to levitate from the outer peripheral surface of the rotor 2. Thus, it is possible to maintain a non-contact state stably between the rotor 2 and the thin plates 11.

With reference to FIGS. 3A and 3B, the operation of the seal device 10 will be described. FIG. 3A is a cross-sectional view of the seal device 10 along a plane passing through the gap between the thin plates 11. FIG. 3B is a cross-sectional view of the seal device 10 along a plane perpendicular to the width direction of the thin plates 11, that is a cross-sectional view taken in a direction perpendicular to the axial direction of the rotor 2.

As shown in FIGS. 3A and 3B, the thin plates 11 are inclined with respect to the outer peripheral surface of the rotor 2, and thus has a lower surface 11b facing the rotor 2 and an upper surface 11a disposed opposite to the lower surface 11b and facing the stator 7 (see FIG. 1). Furthermore, in the configuration example shown in FIG. 3A, in the width direction of the thin plates 11, the gap between the thin plates 11 and the second side plate 22 is greater than the gap between the thin plates 11 and the first side plate 20.

As shown in FIG. 3A, during operation of the steam turbine 1 (rotation of the rotor 2), if a pressure of a fluid flowing from the high-pressure space 8 toward the low-pressure space 9 is applied to each thin plate 11, a static-pressure distribution 30a is formed, in which the fluid pressure is highest at the end portion r1 of the tip portion 12 on the side of the high-pressure space 8 and becomes weaker gradually toward the corner portion r2 at the diagonally opposite position, on the upper surface 11a and the lower surface 11b of each thin plate 11.

In other words, the fluid g flowing from the high-pressure space 8 toward the low-pressure space 9 forms a flow shown by the dotted line in FIG. 3A when passing through the gap between the thin plates 11. Specifically, the fluid g flows into the gap between the thin plates 11 through the clearance between the outer peripheral surface of the rotor 2 and the inner peripheral edge 20a of the first side plate 20 from the high-pressure space 8, and forms an upward flow that flows from the end portion r1 of the tip portion 12 on the side of the high-pressure space 8 toward the corner portion r2 on the side of the root portion 14 on the side of the low-pressure space 9. The upward flow is formed radially from the side of the end portion R1 of the tip portion 12 on the side of the high-pressure space 8 in the gap between the thin plates 11. The fluid g forms a downward flow in the gap between the thin plates 11 and the second side plate 22, and flows out into the low-pressure space 9 through the clearance between the outer peripheral surface of the rotor 2 and the inner peripheral edge 22a of the second side plate 22.

Accordingly, as shown in FIG. 3B, the fluid-pressure distributions 30b, 30c applied in a perpendicular direction to the upper surface 11a and the lower surface 11b of each thin plate 11 has a triangular distribution shape that is greater toward the tip portion 12 and smaller toward the root portion 14.

While the respective fluid-pressure distributions 30b, 30c of the upper surface 11a and the lower surface 11b have substantially the same shape, each thin plate 11 is disposed inclined so as to form an acute angle with respect to the outer peripheral surface of the rotor 2, and thus the relative positions of the respective fluid-pressure distributions 30b, 30c of the upper surface 11a and the lower surface 11b are offset by the dimension s1. Accordingly, the upper surface 11a and the lower surface 11b have different fluid pressures at a point P on a line extending from the root portion 14 toward the tip portion 12 of the thin plate 11.

In other words, on a point P in the length direction of the thin plate 11, the fluid pressure applied to the lower surface 11b (Fb) is higher than the gas pressure applied to the upper surface 11a (Fa), and thus the pressures act in a direction that the thin plate 11 deforms and levitates from the rotor 2. Meanwhile, the direction is opposite in the vicinity of the tip portion 12 of each thin plate 11, where the fluid pressure is applied only to the upper surface 11a. This force is canceled by the fluid pressure (Fc) of the fluid g flowing between the outer peripheral surface of the rotor 2 and the tip of the thin plate 11 acting in a direction to levitate the tip portion 12 of the thin plate 11 from the outer peripheral surface of the rotor 2, which prevents generation of a force that pushes the tip of the thin plate 11 against the rotor 2. Thus, the pressure load of the fluid pressure applied to each thin plate 11 is (Fb+Fc)>Fa, and thereby it is possible to deform each thin plate 11 to levitate from the outer peripheral surface of the rotor 2.

Accordingly, it is possible to generate a pressure difference between the upper surface 11a and the lower surface 11b of each thin plate 11, and deform the thin plates 11 to levitate from the outer peripheral surface of the rotor 2, thus creating a non-contact state. It should be noted that, during operation of the steam turbine 1, the thin plates 11 and the rotor 2 are mainly in a non-contact state, but a non-contact state and a contact state may exist mixed in time series.

The above description features the mechanism to bring each thin plate 11 into a non-contact state with the rotor 2 by utilizing a pressure difference at pressurization from the high-pressure space 8. Besides this mechanism, levitation of each thin plate 11 is also caused in response to a dynamic-pressure effect from rotation of the rotor 2.

In other words, each thin plate 11 is designed to have a predetermined rigidity that depends on the plate thickness in the axial direction of the rotor 2. Furthermore, each thin plate 11 is mounted to the stator 7 so as to form an acute angle with the outer peripheral surface of the rotor 2 with respect to the rotational direction of the rotor 2 as described above, so that the tip of each thin plate 11 is in contact with the rotor 2 at a predetermined pre-compression pressure while the rotor 2 is stopped, but each thin plate 11 and the rotor 2 are in a non-contact state when the rotor 2 rotates because the dynamic-pressure effect caused by rotation of the rotor 2 causes the tip of the thin plate 11 to levitate.

The seal device 10 having the above configuration further includes the following configuration in order to suppress oscillation due to flutter of the thin plates 11 effectively while realizing the non-contact state of the thin plates 11 with the rotor 2 appropriately.

As shown in FIGS. 4 to 7, in the seal device 10 according to some embodiments, the radial-directional position of the tip surface 12a of each thin plate 11 has a first distribution such that the side of the high-pressure space 8 is more away from the outer peripheral surface of the rotor 2 than the side of the low-pressure space 9, in at least a partial range of the tip surface 12a with respect to the axial direction of the rotor 2. That is, each thin plate 11 is configured such that, of the thin-plate tip surface 12a, the distance $d_1$ between the end portion 12b on the side of the high-pressure space 8 and the outer peripheral surface of the rotor 2 is greater than the distance $d_2$ between the end portion 12c on the side of the low-pressure space 9 and the outer peripheral surface of the rotor 2. Thus, between the end portion 12b on the side of the high-pressure space 8 and the end portion 12c on the side of the low-pressure space 9, the tip portion 12 of the thin plate 11 is formed so that the distance between the thin-plate tip surface 12a and the outer peripheral surface of the rotor 2 decreases continuously or intermittently, or in stages, from the side of the high-pressure space 8 toward the side of the low-pressure space 9. Further, the tip portion 12 of the thin plate 11 is configured such that the radial-directional position of the thin-plate tip surface 12a at the axial-directional position closest to the high-pressure space 8 is disposed on the inner side, in the radial direction, of the inner peripheral edge 20a of the first side plate 20. That is, of the thin-plate tip surface 12a, the distance $d_1$ between the end portion 12b on the side of the high-pressure space 8 and the outer peripheral surface of the rotor 2 is smaller than the distance $d_3$ between the inner peripheral edge 20a of the first side plate 20 and the outer peripheral surface of the rotor 2.

Further, "at least a partial range of the tip surface 12a with respect to the axial direction of the rotor 2" in which the first distribution is formed may be the entire range of the tip surface 12a of the thin plate 11 with respect to the axial direction, or a partial range of the tip surface 12a. In the example shown in FIGS. 4 to 6, the region in which the first distribution is formed is the entire range from the end portion 12b on the side of the high-pressure space 8 to the end portion 12c on the side of the low-pressure space 9. In the example shown in FIG. 7, the range in which the first distribution is formed is a partial range (first region 18) on the side of the high-pressure space 8.

Figure 4C:
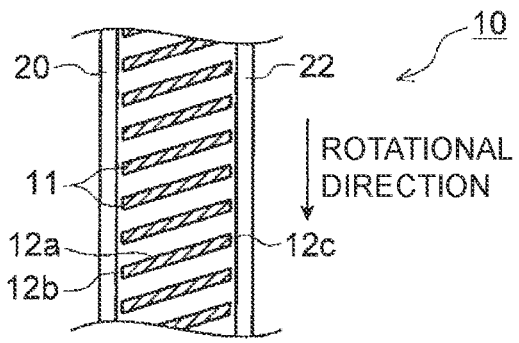
FIG. 4C is a diagram of the seal device in FIG. 4A as seen in the direction of arrow A.

When the rotor 2 rotates, the tip portion 12 of the thin plate 11 levitates from the outer peripheral surface of the rotor 2 due to the static-pressure distribution as described above, and is in a non-contact state with respect to the outer peripheral surface of the rotor 2. At this time, the thin plate 11 having flexibility is slightly curved in the length direction from the root portion 14 to the tip portion 12. Herein, in a case where the radial-directional position of the tip surface 12a of each thin plate 11 has the above described distribution, the flow rate of the above described upward flow (see FIG. 3A) on the side of the high-pressure space 8 increases, and thus the levitation amount of the end portion 12b on the side of the high-pressure space 8 is greater than the levitation amount of the end portion 12c on the side of the low-pressure space 9. That is, as shown in FIGS. 4C, 5C, and 6C, in the cross-section of the tip portion 12, the end portion 12b on the side of the high-pressure space 8 is disposed downstream of the end portion 12c on the side of the low-pressure space 9, with respect to the rotational direction of the rotor 2. Thus, the thin plate 11 deforms to distort with respect to the width direction of the rotor 2.

Meanwhile, as shown in FIG. 8, the plurality of thin plates 11 are arranged in the circumferential direction of the rotor 2, and thus the circumferential length $R_2$ passing through the root portions 14 of the thin plates 11 is greater than the circumferential length $R_1$ passing through the tip portions 12. Due to the circumferential-length difference between the circumferential length $R_2$ and the circumferential length $R_1$, the distance $\Delta T_2$ between the root portions 14 of adjacent thin plates 11 is greater than the distance $\Delta T_1$ between the tip portions 12. That is, the gap between the tip portions 12 of adjacent thin plates 11 is narrower than the gap between the root portions 14. In particular, the distance between the tip portions 12 is narrower at the side of the low-pressure space 9 closer to the outer peripheral surface of the rotor 2. Thus, if the above described distortion occurs at the tip portion 12 of the thin plate 11, the thin plates 11 are likely to contact each other at the side of the low-pressure space 9. When being in contact with one another as described above, the thin plates 11 support one another, and thereby it is possible to suppress oscillation of the thin plates 11 due to flutter. Furthermore, for instance, if the radial-directional position of the thin-plate tip surface 12a is on the outer side, in the radial direction, of the inner peripheral edge 20a of the first side plate 20, the space between the outer peripheral surface of the rotor 2 and the thin-plate tip surface 12a becomes excessively great, thus increasing the clearance between the outer peripheral surface of the rotor 2 and the thin-plate tip surface 12a at levitation of the thin plate 11, which may decrease the shaft seal effect. In this regard, with the above configuration, the radial-directional position of the thin-plate tip surface 12a is on the inner side, in the radial direction, of the inner peripheral edge 20a of the first side plate 20, and thereby it is possible to form the space between the outer peripheral surface of the rotor 2 and the thin-plate tip surface 12a appropriately, and to suppress oscillation due to flutter while maintaining the shaft seal effect.

Next, a specific configuration example of the seal device 10 according to each embodiment will be described. In FIGS. 4A to 7B, features having the same configuration are associated with the same reference numerals, and features having different configurations are associated with different reference numerals.

Figure 4A:
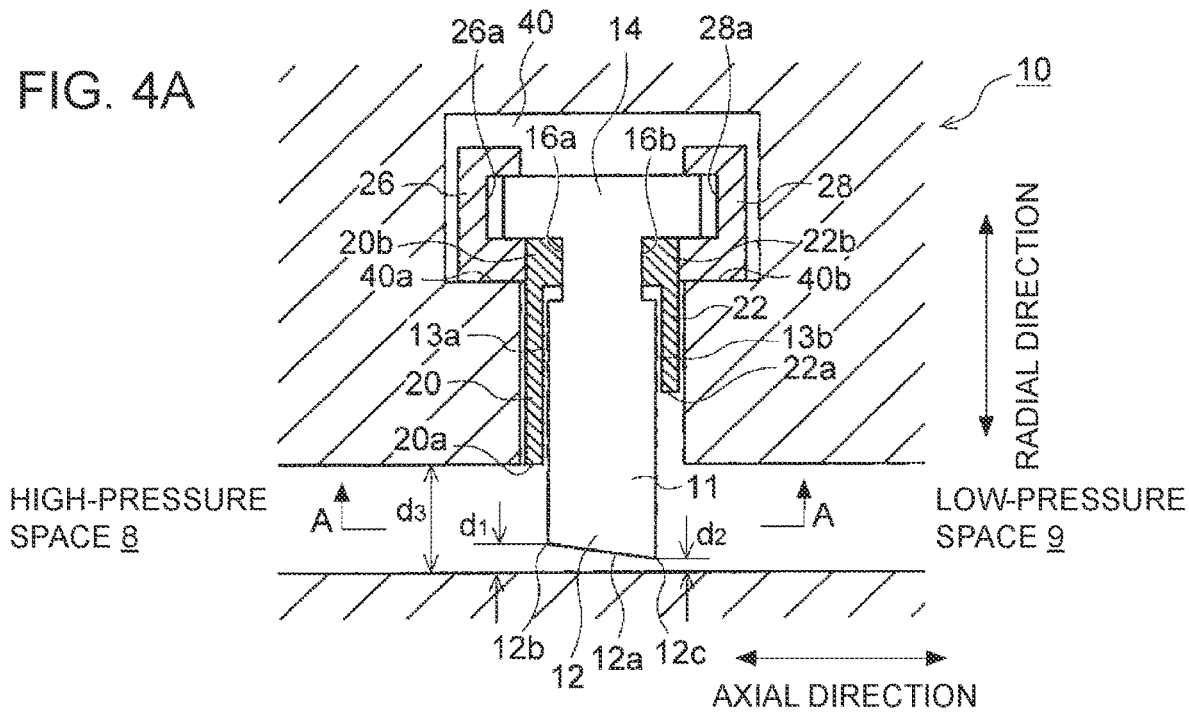
FIG. 4A is a cross-sectional view of a seal device according to an embodiment.
Figure 4B:
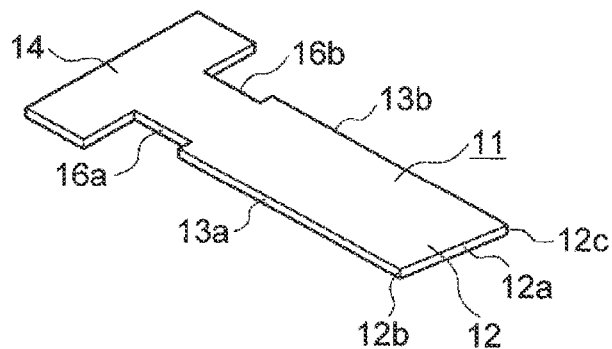
FIG. 4B is a perspective view of the thin plate shown in FIG. 4A.

FIG. 4A is a cross-sectional view of the seal device 10 according to an embodiment. FIG. 4B is a perspective view of the thin plate 11 shown in FIG. 4A. FIG. 4C is a diagram of the seal device 10 in FIG. 4A as seen in the direction of arrow A.

The seal device 10 according to an embodiment is configured such that the distance between the thin-plate tip surface 12a and the outer peripheral surface of the rotor 2 decreases from the side of the high-pressure space 8 toward the side of the low-pressure space 9 with respect to the axial direction of the rotor 2. Further, the thin-plate tip surface 12a is such an inclined surface that the side of the high-pressure space 8 is farther away from the outer peripheral surface of the rotor 2 than the side of the low-pressure space 9, in the axial direction of the rotor 2.

Specifically, the thin plate 11 is configured such that the distance $d_1$ between the end portion 12b on the side of the high-pressure space 8 and the outer peripheral surface of the rotor 2 is greater than the distance $d_2$ between the end portion 12c on the side of the low-pressure space 9 and the outer peripheral surface of the rotor 2, and the thin plate 11 is inclined linearly from the end portion 12b on the side of the high-pressure space 8 toward the end portion 12c on the side of the low-pressure space 9. The end portion 12b on the side of the high-pressure space 8 may be formed to have a corner portion as shown in the drawing, or may have an R shape although not depicted.

With the above configuration, by improving the shape of the thin-plate tip surface 12a to adjust the distribution of the distance between the thin-plate tip surface 12a and the outer peripheral surface of the rotor 2, it is possible to fine-adjust the distortion amount of the thin plate 11. Thus, it is possible to make the thin plates 11 contact with each other appropriately. Furthermore, since the thin-plate tip surface 12a has a simple inclined surface, the thin plate 11 can be machined easily.

In the example shown in FIG. 4, the entire region of the tip surface 12a from the end portion 12b on the side of the high-pressure space 8 to the end portion 12c on the side of the low-pressure space 9 with respect to the width direction of the thin plate 11 is an inclined surface. However, the region of the inclined surface is not limited to this, and it is satisfied if the inclined surface is formed in some region between the end portion 12b on the side of the high-pressure space 8 and the end portion 12c on the side of the low-pressure space 9 with respect to the width direction of the thin plate 11. For instance, the inclined surface may be formed from the end portion 12b on the side of the high-pressure space 8 to a position closer to the high-pressure space 8 than the end portion 12c on the side of the low-pressure space 9, with respect to the width direction of the thin plate 11. Alternatively, the inclined surface may be formed from a position closer to the low-pressure space 9 than the end portion 12b on the side of the high-pressure space 8 to the end portion 12c on the side of the low-pressure space 9, with respect to the width direction of the thin plate 11. Alternatively, the inclined surface may be formed in a middle region between the end portion 12b on the side of the high-pressure space 8 and the end portion 12c on the side of the low-pressure space 9, with respect to the width direction of the thin plate 11.

Figure 5A:
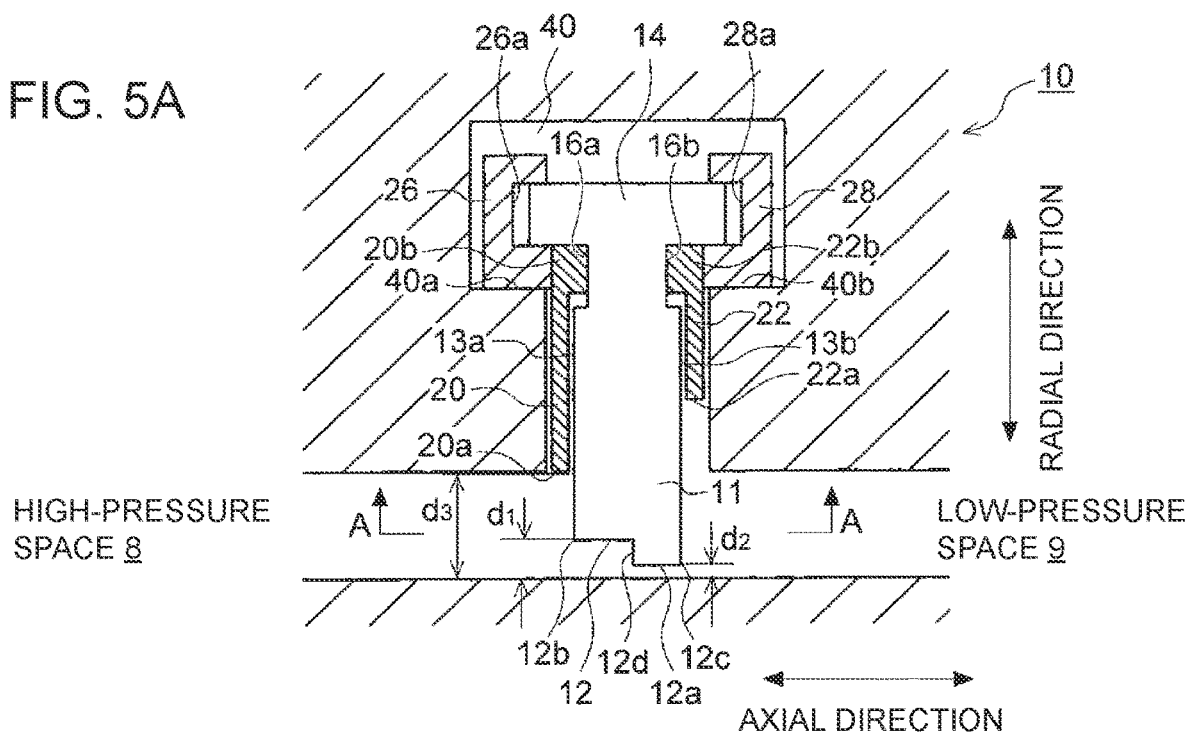
FIG. 5A is a cross-sectional view of a seal device according to another embodiment.
Figure 5B:
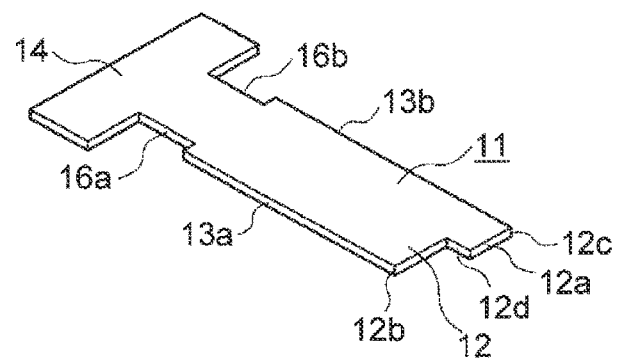
FIG. 5B is a perspective view of the thin plate shown in FIG. 5A.
Figure 5C:
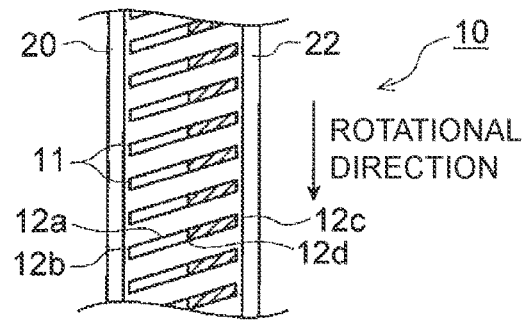
FIG. 5C is a diagram of the seal device in FIG. 5A as seen in the direction of arrow B.

FIG. 5A is a cross-sectional view of the seal device 10 according to another embodiment. FIG. 5B is a perspective view of the thin plate 11 shown in FIG. 5A. FIG. 5C is a diagram of the seal device 10 in FIG. 5A as seen in the direction of arrow B.

The seal device 10 according to another embodiment is configured such that the thin-plate tip surface 12a has such a step 12d that the side of the high-pressure space 8 is farther away from the outer peripheral surface of the rotor 2 than the side of the low-pressure space 9, in the axial direction of the rotor 2. That is, the step 12d is disposed between the end portion 12b on the side of the high-pressure space 8 and the end portion 12c on the side of the low-pressure space 9, and the distance $d_1$ between the thin-plate tip surface 12a closer to the high-pressure space 8 than the step 12d and the outer peripheral surface of the rotor 2 is greater than the distance $d_2$ between the thin-plate tip surface 12a closer to the low-pressure space 9 than the step 12d and the outer peripheral surface of the rotor 2.

With the above configuration, the thin-plate tip surface 12a is formed by the step 12d, and thus the thin-plate 11 can be machined easily. Furthermore, in the flow direction of the fluid, the clearance between the outer peripheral surface of the rotor 2 and the thin-plate tip surface 12a decreases rapidly from the step 12d, and thus it is possible to form the above described upward flow (see FIG. 3A) effectively. With the above configuration, by adjusting the height of the step of the thin-plate tip surface 12a, it is possible to fine-adjust the distortion amount of the thin plate 11.

The step 12d of the thin-plate tip surface 12a may be configured to be positioned closer to the low-pressure space 9 than the midpoint of the thin plate 11 with respect to the width direction. Accordingly, on the side of the high-pressure space 8, it is possible to ensure an adequate space between the outer peripheral surface of the rotor 2 and the thin-plate tip surface 12a, and thus it is possible to form an upward flow in the gap between the thin plates 11 in a region closer to the low-pressure space 9. Thus, it is possible to promote distortion of the thin plates 11, so that the thin plates 11 make contact with each other more easily.

Further, while the thin-plate tip surface 12a has a single step 12d in the depicted example, the thin-plate tip surface 12a may have two or more steps. Also in this case, each step is formed so that the distance between the thin-plate tip surface 12a closer to the high-pressure space 8 than the step and the outer peripheral surface of the rotor 2 is greater than the distance between the thin-plate tip surface 12a closer to the low-pressure space 9 than the step 12d and the outer peripheral surface of the rotor 2.

Furthermore, while both of the thin-plate tip surface 12a closer to the high-pressure space 8 than the step 12d and the thin-plate tip surface 12a closer to the low-pressure space 9 than the step 12d are parallel to the outer peripheral surface of the rotor 2 in the depicted example, at least one of the thin-plate tip surfaces 12a may be formed by an inclined surface (see FIG. 4) or a curved surface (see FIG. 6).

Figure 6A:
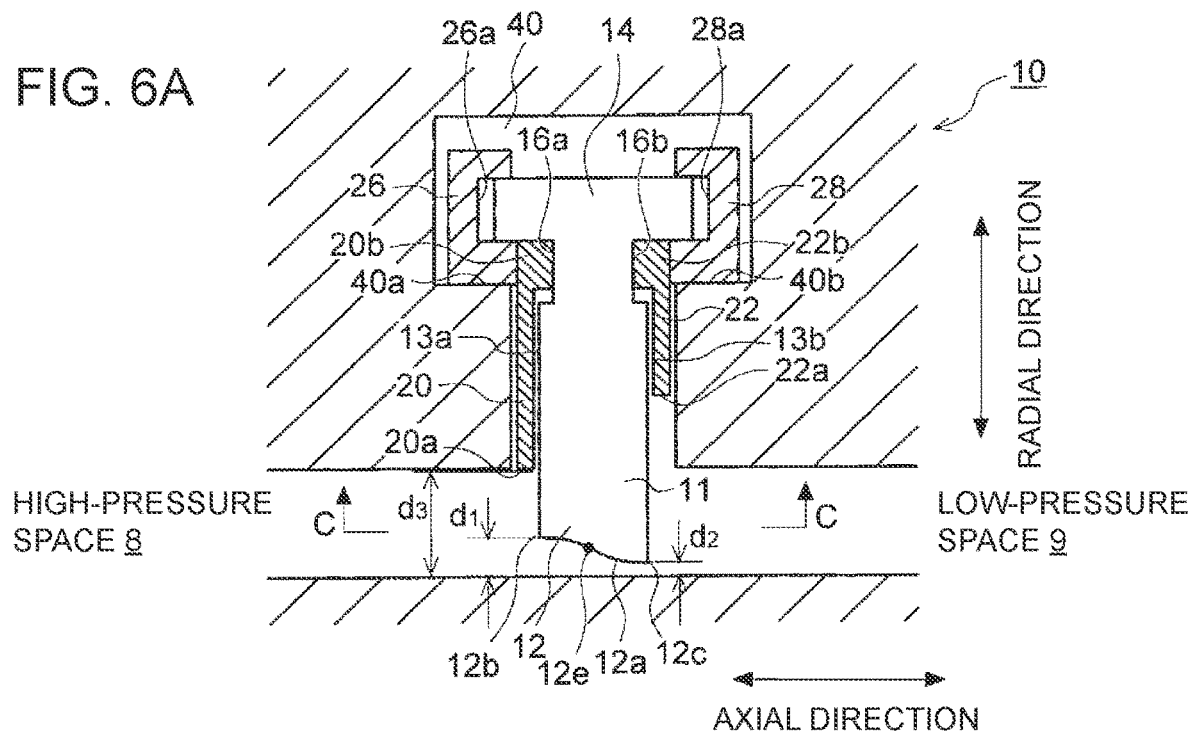
FIG. 6A is a cross-sectional view of a seal device according to another embodiment.
Figure 6B:
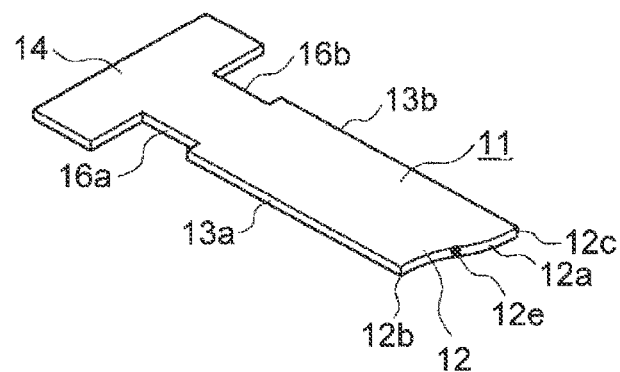
FIG. 6B is a perspective view of the thin plate shown in FIG. 6A.
Figure 6C:
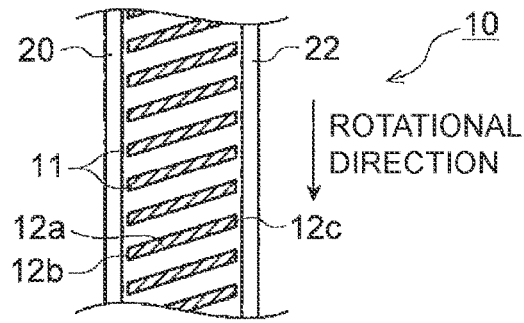
FIG. 6C is a diagram of the seal device in FIG. 6A as seen in the direction of arrow C.

FIG. 6A is a cross-sectional view of the seal device according to another embodiment. FIG. 6B is a perspective view of the thin plate 11 shown in FIG. 6A. FIG. 6C is a diagram of the seal device in FIG. 6A as seen in the direction of arrow C.

The seal device 10 according to another embodiment is configured such that the distance between the thin-plate tip surface 12a and the outer peripheral surface of the rotor 2 decreases from the side of the high-pressure space 8 toward the side of the low-pressure space 9 with respect to the axial direction of the rotor 2. Furthermore, the thin-plate tip surface 12a has a curved shape.

Specifically, the thin plate 11 is configured such that the distance $d_1$ between the end portion 12b on the side of the high-pressure space 8 and the outer peripheral surface of the rotor 2 is greater than the distance $d_2$ between the end portion 12c on the side of the low-pressure space 9 and the outer peripheral surface of the rotor 2, and the thin plate 11 has a curved shape with respect to the outer peripheral surface of the rotor 2 between the end portion 12b on the side of the high-pressure space 8 and the end portion 12c on the side of the low-pressure space 9.

With the above configuration, by improving the shape of the thin-plate tip surface 12a to adjust the distribution of the distance between the thin-plate tip surface 12a and the outer peripheral surface of the rotor 2, it is possible to fine-adjust the distortion amount of the thin plate 11. Thus, it is possible to make the thin plates 11 contact with each other appropriately.

In the depicted example, the thin-plate tip surface 12a has a S shape in which an inflexion point 12e is disposed between the end portion 12b on the side of the high-pressure space 8 and the end portion 12c on the side of the low-pressure space 9. In other words, the thin-plate tip surface 12a closer to the high-pressure space 8 than the inflexion point 12e has a curved shape protruding toward the stator 7, and the thin-plate tip surface 12a closer to the low-pressure space 9 than the inflexion point 12e has a curved shape protruding toward the rotor 2.

In this embodiment, the curved shape of the thin-plate tip surface 12a is not limited to the depicted example, and the thin-plate tip surface 12a may have a shape without an inflexion point. For instance, the thin-plate tip surface 12a may have a curved shape protruding toward the rotor 2, or a curved shape protruding toward the stator 7, in the entire region from the end portion 12b on the side of the high-pressure space 8 to the end portion 12c on the side of the low-pressure space 9. Alternatively, the thin-plate tip surface 12a may have a curved shape with two or more inflexion points.

Figure 7A:
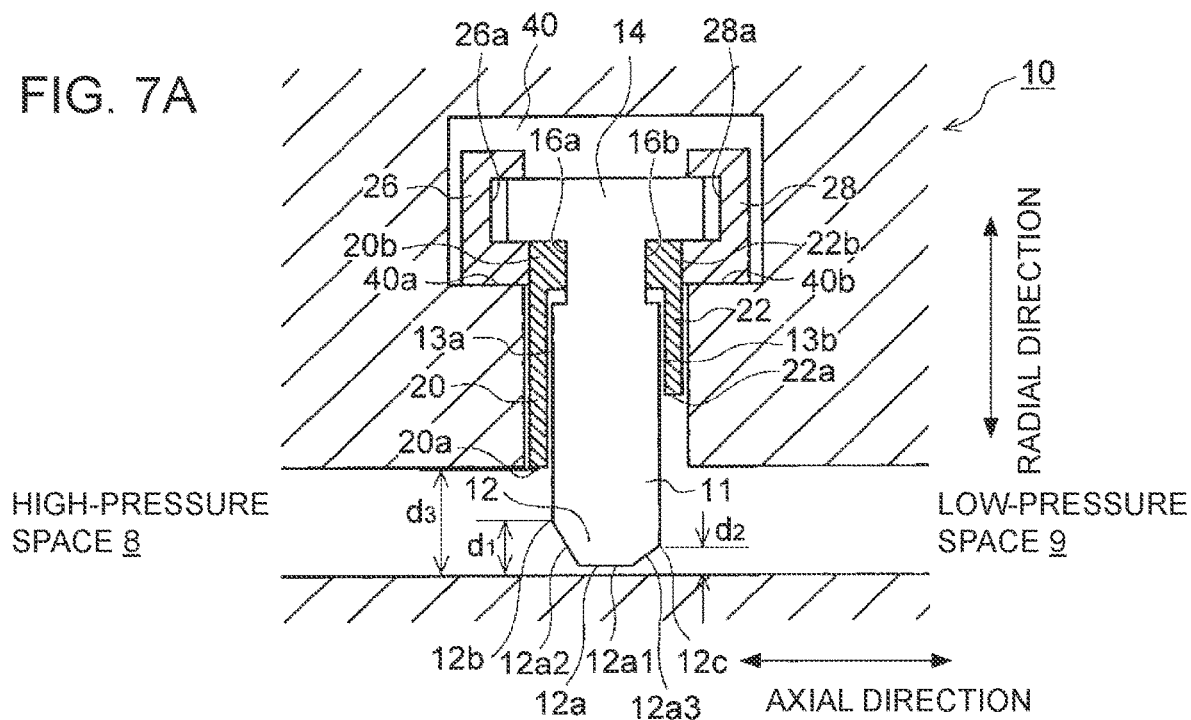
FIG. 7A is a cross-sectional view of a seal device according to yet another embodiment.
Figure 7B:
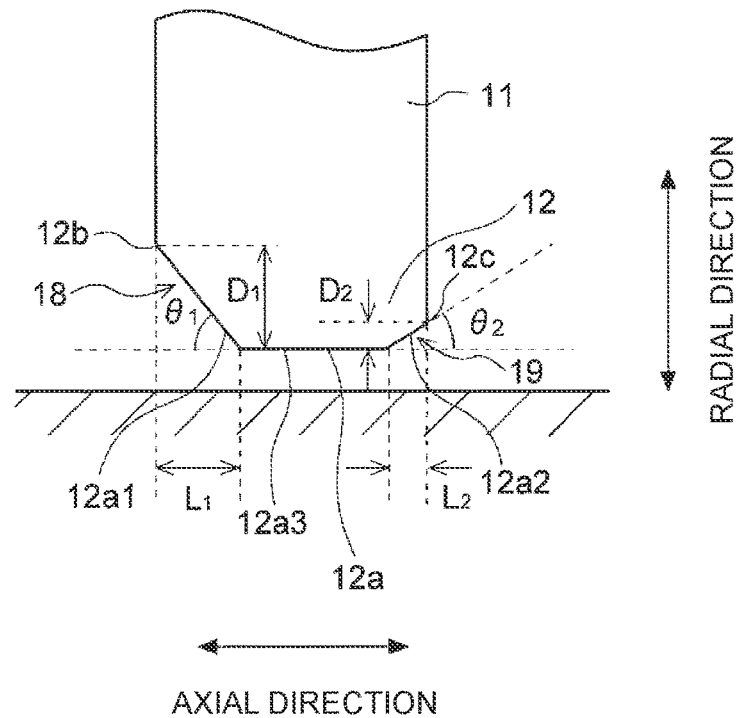
FIG. 7B is a partial enlarged view of the thin plate shown in FIG. 7A.
Figure 8:
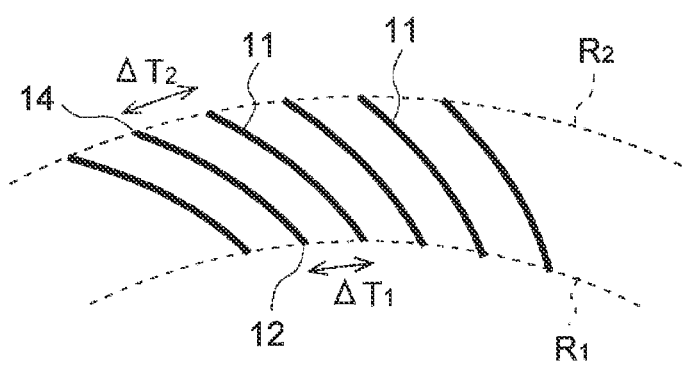
FIG. 8 is a diagram for describing the interval between thin plates.

FIG. 7A is a cross-sectional view of the seal device 10 according to yet another embodiment. FIG. 7B is an enlarged partial view of the thin plate 11 shown in FIG. 7A.

The seal device 10 according to yet another embodiment is configured such that, of the tip surface 12a of the thin plate 11, the radial-directional position of the end portion 12b at the axial-directional position closest to the high-pressure space 8 is disposed on the inner side of the inner peripheral edge 20a of the first side plate 20, with respect to the radial direction. Furthermore, of the tip surface 12a of the thin plate 11, the radial-directional position of the end portion 12c at the axial-directional position closest to the low-pressure space 9 is disposed on the inner side of the inner peripheral edge 22a of the second side plate 22, with respect to the radial direction.

Furthermore, the seal device 10 is provided with the thin plate 11 having the tip surface 12a including the first region 18 and the second region 19.

The first region 18 is disposed on the tip surface 12a of the thin plate 11 at the side of the high-pressure space 8, with respect to the axial direction of the rotor 2. In the first region 18 of the tip surface 12a, the radial-directional position of the tip surface 12a has such a distribution that the radial-directional position is farther away from the outer peripheral surface of the rotor from the side of the low-pressure space 9 toward the side of the high-pressure space 8. Furthermore, the second region 19 is disposed on the tip surface 12a of the thin plate 11 at the side of the low-pressure space 9, with respect to the axial direction of the rotor 2. In the second region 19 of the tip surface 12a, the radial-directional position of the tip surface 12a has such a distribution that the radial-directional position is farther away from the outer peripheral surface of the rotor from the side of the high-pressure space 8 toward the side of the low-pressure space 9. The first region 18 and the second region of the tip surface 12a may have an asymmetric shape with respect to a line passing through the center of the axial-directional width of the thin plate 11.

With the above configuration, in the first region 18 of the tip surface 12a on the side of the high-pressure space 8, the radial-directional position of the tip surface 12a has such a distribution that the radial-directional position of the tip surface 12a is farther away from the outer peripheral surface of the rotor 2 from the side of the low-pressure space 9 toward the side of the high-pressure space 8, which makes it possible to achieve an effect to promote the levitation effect of the thin plate 11.

Furthermore, in the second region 19 of the tip surface 12a on the side of the low-pressure space 9, the radial-directional position of the tip surface 12a has such a distribution that the radial-directional position of the tip surface 12a is farther away from the outer peripheral surface of the rotor 2 from the side of the high-pressure space 8 toward the side of the low-pressure space 9, which promotes formation of low pressure between the thin plates 11 on the side of the low-pressure space 9, and creates an effect to push the tip surface 12*a* against the outer peripheral surface of the rotor.

As described above, from the effect to levitate the thin plates 11 in the first region 18 on the side of the high-pressure space 8 and the effect to push the thin plates 11 in the second region 19 on the side of the low-pressure space 9, it is possible to achieve the effect to levitate the thin plates 11 stably.

In the present embodiment, a steep distribution of the radial-directional position of the tip surface 12*a* that does not contribute to the effect to levitate or push the thin plate 11 is not applied as the first region 18 or the second region 19. Specifically, the first region 18 and the second region 19 may be applied to only a region in which the inclination of the tip surface 12*a* with respect to the axial direction of the rotor 2 is 60° or less. For instance, in FIG. 7, if the side surface of the thin plate 11 on the side of the low-pressure space 9 is slightly cut off, the tip surface 12*a* has a shape that raises steeply outward in the radial direction from the axial direction on the side of the low-pressure space 9. Such a tip-surface shape barely contributes to the effect to push the thin plates 11, and thus this steep cut-out region is not applied as the second region 19.

In an embodiment, provided that $L_1$ is the length of the first region 18 in the axial direction of the rotor 2 and $L_2$ is the length of the second region 19 in the axial direction of the rotor 2, $L_1 > L_2$ is satisfied.

With the above configuration, it is possible to ensure an appropriate balance between the effect to levitate the thin plates 11 in the first region 18 on the side of the high-pressure space 8 and the effect to push the thin plates 11 in the second region 19 on the side of the low-pressure space 9.

In the depicted example, the first region 18 on the side of the high-pressure space 8 is formed by the first inclined surface 12*a*1 including the end portion 12*b* on the side of the high-pressure space 8. The second region 19 on the side of the low-pressure space 9 is formed by the second inclined surface 12*a*2 including the end portion 12*c* on the side of the low-pressure space 9. Furthermore, a linear portion 12*a*3 is disposed between the first inclined surface 12*a*1 and the second inclined surface 12*a*2.

The first inclined surface 12*a*1 is inclined linearly so that the distance from the outer peripheral surface of the rotor 2 reduces from the end portion 12*b* on the side of the high-pressure space 8 toward the linear portion 12*a*3.

The second inclined surface 12*a*2 is inclined linearly so that the distance from the outer peripheral surface of the rotor 2 reduces from the end portion 12*c* on the side of the low-pressure space 9 toward the linear portion 12*a*3.

The linear portion 12*a*3 is formed in the center region of the tip surface 12*a* in the axial direction of the rotor 2. Furthermore, the linear portion 12*a*3 is configured so that the distance from the outer peripheral surface of the rotor 2 is substantially constant in the axial direction of the rotor 2. The distance between the linear portion 12*a*3 and the outer peripheral surface of the rotor 2 may be smaller than the end portion 12*b* on the side of the high-pressure space 8 and the end portion 12*c* on the side of the low-pressure space 9.

Furthermore, on the tip surface 12*a* of the thin plate 11, the length $D_1$ of the first region 18 in the radial direction of the rotor 2 may be greater than the length $D_2$ of the second region 19 in the radial direction of the rotor 2. That is, the tip surface 12*a* of the thin plate 11 may be configured to satisfy $D_1 > D_2$.

Furthermore, the tip surface 12*a* of the thin plate 11 may satisfy $D_1/L_1 > D_2/L_2$, provided that $L_1$ is the length of the first region 18 in the axial direction of the rotor 2 and $L_2$ is the length of the second region in the axial direction of the rotor 2. For instance, as shown in FIG. 7, in a case where the first region 18 is formed by the first inclined surface 12*a*1 and the second region 19 is formed by the second inclined surface 12*a*2, the angle $\theta_1$ formed between the axial direction of the rotor 2 and the first inclined surface 12*a*1 is greater than the angle $\theta_2$ formed between the axial direction of the rotor 2 and the second inclined surface 12*a*2.

For instance, if the pressure balance between the thin plates 11 is lost and the thin plates 11 are pushed against the outer peripheral surface of the rotor 2, the above distribution (e.g. shape of inclined surface) changes on the side of the high-pressure space 8 and on the side of the low-pressure space 9, along with abrasion of the thin plates 11. In such a case, with the above configuration, the loss occurs from the second region 19 having a smaller length than the first region 18 in the radial direction of the rotor 2, and the shape of the thin plates 11 changes to such a shape that a levitation force on the side of the high-pressure space 8 can be easily achieved. Thus, it is possible to prevent development of abrasion of the thin plates 11.

In the example shown in FIG. 7, the first region 18 and the second region 19 are formed by the first inclined surface 12*a*1 and the second inclined surface 12*a*2 having a linear shape, respectively. However, in an example not shown in the drawings, the first region 18 and the second region 19 may have an R shape. For instance, the first region 18 and the second region 19 each have a curved shape protruding toward the rotor 2 at the center in the axial direction.

Although FIGS. 7A and 7B are not accompanied by drawings corresponding to FIGS. 4B, 4C, 6B, and 6C, also in the embodiment shown in FIGS. 7A and 7B, similarly to the state shown in FIGS. 4C, 5C, and 6C, the end portion 12*b* on the side of the high-pressure space 8 is disposed downstream of the end portion 12*c* on the side of the low-pressure space 9 with respect to the rotational direction of the rotor 2, in the cross section of the end portion 12, and the thin plate 11 deforms to distort with respect to the width direction of the thin plate 11, during rotation of the rotor 2.

In an embodiment, the above described seal device 10 may further include the following configuration.

As shown in FIGS. 4A to 7B, the seal device 10 further includes a pair of retainers 26, 28 that hold the plurality of thin plates 11 at the side of the root portions 14. Further, the first side plate 20 and the second side plate 22 are supported by retainers 26, 28 while being held between the retainers 26, 28 and corresponding one of the both side surfaces 13*a*, 13*b* of the plurality of thin plates 11.

In a specific configuration, the stator 7 includes an annular holding space 40 formed therein, for holding the retainers 26, 28, the first side plate 20, the second side plate 22, and the plurality of thin plates 11. The holding space 40 is formed to have a T shape in a cross section along the rotational axis O of the rotor 2. The holding space 40 includes a first space 41 formed on the inner peripheral side in the radial direction of the rotor 2 and communicating with the high-pressure space 8 and the low-pressure space 9, and a second space 42 formed on the outer peripheral side in the radial direction of the rotor 2 and communicating with the first space 41.

Each of the thin plates 11 has a substantially T shape, the width being greater at the side of the root portion 14 than at the side of the tip portion 12. Cut-out portions 16*a*, 16*b* are disposed on the both side surfaces 13*a*, 13*b* between the root portion 14 and the tip portion 12, and have a smaller width than the side of the tip portion 12.

The pair of retainers 26, 28 have recessed portions 26a, 28a, respectively, and have a substantially U shape in a cross section including the rotational axis O of the rotor 2. The pair of retainers 26, 28 are accommodated in the second space 42 while the root portions 14 of the thin plates 11 are fit into the recessed portions 26a, 28a. In other words, the pair of retainers 26, 28 are configured to nip and support the root portions 14 of the plurality of thin plates 11 arranged in a multiple-layered fashion in the circumferential direction of the rotor 2 from the both side surfaces 13a, 13b. Meanwhile, the side surfaces of the retainers 26, 28 on the side of the rotor 2 are in contact with the wall surfaces 42a, 42b of the second space 42 on the side of the rotor 2, and thereby the thin plates 11 held between the retainers 26, 28 are supported on the side of the stator 7.

The first side plate 20 and the second side plate 22 have protruding portions 20b, 22b on the outer peripheral side in the radial direction of the rotor 2, respectively. The protruding portions 20b, 22b are configured to engage with the cut-out portions 16a, 16b of the thin plates 11. Further, the first side plate 20 and the second side plate 22 are supported by the retainers 26, 28 while being held between the retainers 26, 28 and corresponding one of the both side surfaces 13a, 13b of the plurality of thin plates 11.

Although not illustrated, the second space 42 may include a spacer nipped between the retainers 26, 28, for reducing backlash of the thin plates 11 with respect to the retainers 26, 28. Further, the second space 42 may be provided with a plurality of biasing members (e.g. plate spring) for supporting the plurality of thin plates 11 arranged in an annular shape in a levitation state so as to be coaxial with the rotational axis of the rotor 2.

As described above, according to the embodiment of the present invention, an upward flow flowing from the end portion on the side of the rotor 2 of the thin plate 11 toward the end portion on the side of the stator 7 is formed in the gap between the thin plates 11, and it is possible to form a suitable static-pressure distribution for causing the thin plates 11 to levitate from the outer peripheral surface of the rotor 2. Thus, it is possible to maintain a non-contact state stably between the rotor 2 and the thin plates 11.

Furthermore, as the flow rate of the above described upward flow on the side of the high-pressure space 8 increases, the gap between the thin plates 11 on the side of the low-pressure space 9 becomes relatively narrow, and the thin plates 11 are more likely to be in contact with each other on the side of the low-pressure space 9 accompanying distortion of the thin plates 11 due to the upward flow. Accordingly, it is possible to suppress oscillation of the thin plate 11 due to flutter.

Embodiments of the present invention were described in detail above, but the present invention is not limited thereto, and various amendments and modifications may be implemented.

For instance, while the steam turbine 1 is described as an example of a turbine according to the present embodiment, the turbine according to the present embodiment is not limited to this, and may be another turbine such as the gas turbine 51 shown in FIG. 11.

Figure 9:
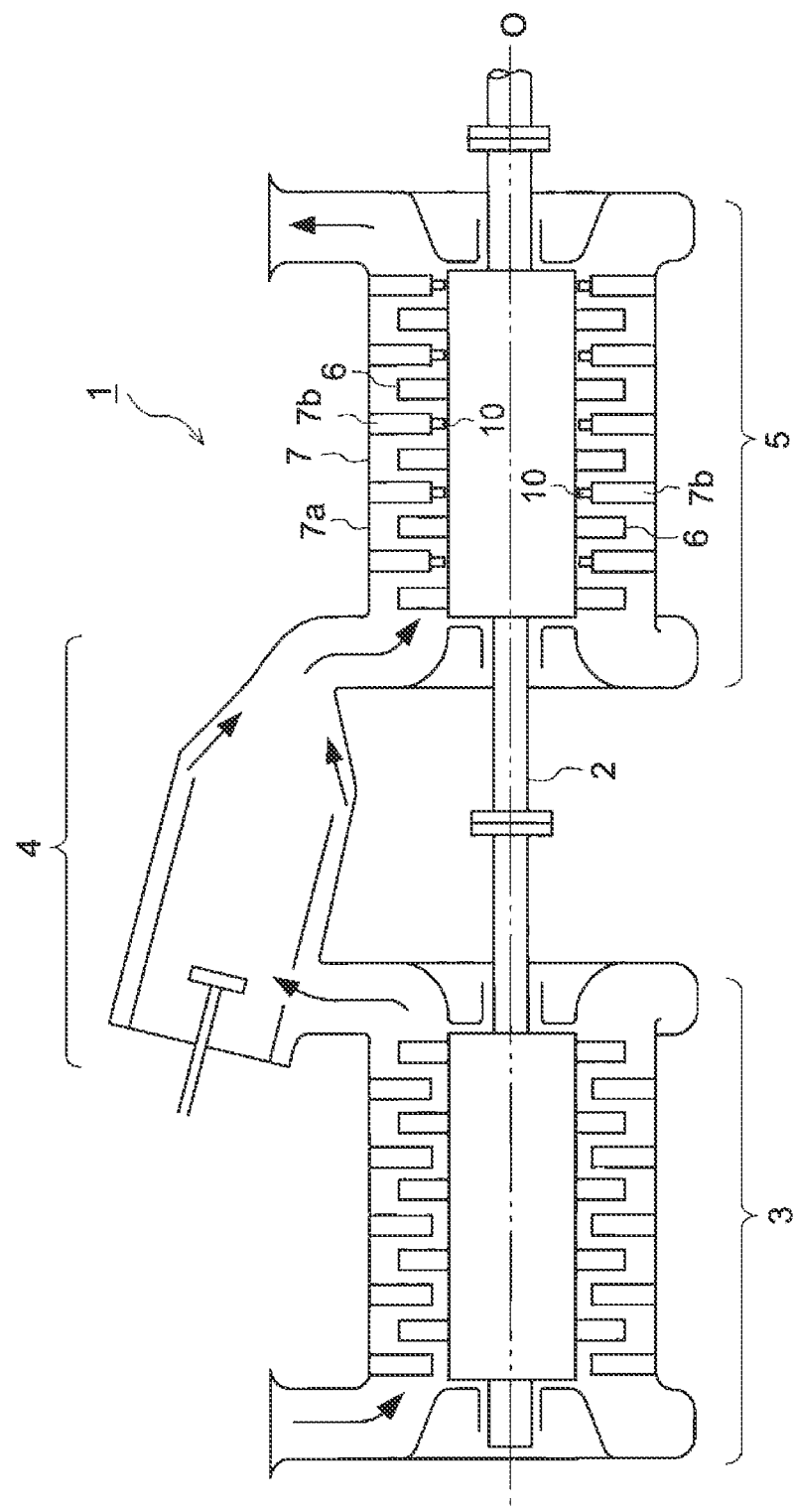
FIG. 9 is a schematic configuration diagram of a gas turbine according to another embodiment.

The gas turbine 51 shown in FIG. 9 includes a compressor 53 for producing compressed air, a combustor 54 for producing combustion gas from the compressed air and fuel, and a turbine 55 configured to be rotary driven by combustion gas. For instance, in the case of the gas turbine 51 for power generation, a generator (not illustrated) is coupled to the turbine 55, so that rotational energy of the turbine 55 generates electric power. The gas turbine 51 of such type uses rotational energy of the turbine 55 as power source of the compressor 53 via the rotor 52 (corresponding to the rotor 2 of FIG. 1).

Specifically, the turbine 55 includes a plurality of rotor blades 56 disposed on the side of the rotor 52 (corresponding to the rotor blades 6 in FIG. 1), a stator (stationary part) 57 including a casing 57a and a plurality of stationary vanes 57b (corresponding to the stationary vanes 7b in FIG. 1) disposed on the side of the casing 57a, and seal devices 50 disposed on the tips of the stationary vanes 57b. As the above seal device 50, the above described seal device 10 can be used.

The plurality of rotor blades 56 and the plurality of stationary vanes 57b are arranged alternately in the direction of the rotational axis O of the rotor 52 (hereinafter, referred to as the axial direction). The rotor 52 rotates as the combustion gas flowing along the axial direction passes through the rotor blades 56 and the stationary vanes 57b, and rotational energy imparted to the rotor 52 is extracted from the end of the shaft to be utilized for power generation or the like.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

DESCRIPTION OF REFERENCE NUMERALS

1 Steam turbine
2 Rotor
4 Steam inlet
6 Rotor blade
7 Stator
7a Casing
7b Stationary vane
8 High-pressure space
8b Stationary vane
9 Low-pressure space
10 Seal device
11 Thin plate
11a Upper surface
11b Lower surface
12 Tip portion
12a Thin-plate tip surface
12a1 First inclined surface
12a2 Second inclined surface
12a3 Linear portion
12b End portion on the side of high-pressure space
12c End portion on the side of low-pressure space
12d Step 12e Inflection point
13a First side surface
13b Second side surface
14 Root portion
16a, 16b Cut-out portion
18 First region
19 Second region
20 First side plate
22 Second side plate
26, 28 Retainer
40 Holding space
51 Gas turbine
52 Rotor
53 Compressor
54 Combustor
55 Turbine
56 Rotor blade
57 Stator
57a Casing
57b Stationary vane
58 High-pressure space
58b Stationary vane
59 Low-pressure space
50 Seal device

The invention claimed is:

1. A seal device for a turbine disposed around a rotor so as to separate a high-pressure space and a low-pressure space, the seal device comprising:
    a plurality of thin plates arranged in a multilayer fashion along an outer peripheral surface of the rotor, each of the thin plates having a thin-plate tip surface facing the outer peripheral surface of the rotor;
    a first side plate disposed so as to face the high-pressure space and covering outer peripheral regions of first side surfaces, on a side of the high-pressure space, of the plurality of thin plates; and
    a second side plate disposed so as to face the low-pressure space and covering outer peripheral regions of second side surfaces, on a side of the low-pressure space, of the plurality of thin plates,
    wherein the first side surface of each of the thin plates is covered with the first side plate in a region extending further to an inner side, in a radial direction of the rotor, than a region of the second side surface covered with the second side plate, and
    wherein the thin plates arranged in the multilayer fashion along the outer peripheral surface of the rotor have the same shape in which:
        a radial-directional position of the thin-plate tip surface of each of the thin plates has a distribution that the side of the high-pressure space is farther away from the outer peripheral surface of the rotor than the side of the low-pressure space in at least a partial range of the thin-plate tip surface in an axial direction of the rotor, and the radial-directional position of the thin-plate tip surface at an axial-directional position closest to the high-pressure space is positioned radially inward with respect to an inner peripheral edge of the first side plate; and
        the thin-plate tip surface includes an inclined surface such that the side of the high-pressure space is farther away from the outer peripheral surface of the rotor than the side of the low-pressure space, in the axial direction of the rotor.

2. The seal device for a turbine according to claim 1, wherein a distance between the thin-plate tip surface and the outer peripheral surface of the rotor decreases from the side of the high-pressure space toward the side of the low-pressure space in the axial direction of the rotor.

3. The seal device for a turbine according to claim 1, further comprising a retainer configured to hold a side of a root portion of the plurality of thin plates,
    wherein the first side plate and the second side plate are supported by the retainer while being nipped between the retainer and a corresponding one of both side surfaces of the plurality of thin plates.

4. The seal device for a turbine according to claim 1, wherein a tip portion of each of the plurality of thin plates is configured to deform and distort during rotation of the rotor so that an end portion on the side of the high-pressure space is disposed downstream of an end portion on the side of the low-pressure space with respect to a rotational direction of the rotor, and
    wherein the thin plates are configured to contact with each other on the side of the low-pressure space due to the distortion.

5. A turbine, comprising:
    a rotor having a turbine blade; and
    the seal device for a turbine according to claim 1 disposed around the rotor so as to separate an annular space around the rotor into a high-pressure space and a low-pressure space.

6. A thin plate for the seal device for a turbine according to claim 1.

7. The seal device for a turbine according to claim 1, wherein the inclined surface of the thin-plate tip surface of each thin plate extends along an entire width of the tip surface.

8. A seal device for a turbine disposed around a rotor so as to separate a high-pressure space and a low-pressure space, the seal device comprising:
    a plurality of thin plates arranged along an outer peripheral surface of the rotor, each of the thin plates having a thin-plate tip surface facing the outer peripheral surface of the rotor;
    a first side plate disposed so as to face the high-pressure space and covering outer peripheral regions of first side surfaces, on a side of the high-pressure space, of the plurality of thin plates; and
    a second side plate disposed so as to face the low-pressure space and covering outer peripheral regions of second side surfaces, on a side of the low-pressure space, of the plurality of thin plates,
    wherein the first side surface of each of the thin plates is covered with the first side plate in a region extending further to an inner side, in a radial direction of the rotor, than a region of the second side surface covered with the second side plate, and
    wherein the thin plates arranged along the outer peripheral surface of the rotor have the same shape in which
        a radial-directional position of the thin-plate tip surface of each of the thin plates has a distribution that the side of the high-pressure space is farther away from the outer peripheral surface of the rotor than the side of the low-pressure space in at least a partial range of the thin-plate tip surface in an axial direction of the rotor, and the radial-directional position of the thin-plate tip surface at an axial-directional position closest to the high-pressure space is positioned radially inward with respect to an inner peripheral edge of the first side plate,
    wherein the thin-plate tip surface includes a step such that the side of the high-pressure space is farther away from the outer peripheral surface of the rotor than the side of the low-pressure space, in the axial direction of the rotor, and the step of the thin-plate tip surface is disposed closer to the low-pressure space than a midpoint of the thin plate with respect to a width direction of the thin plate.

9. The seal device for a turbine according to claim 8, further comprising a retainer configured to hold a side of a root portion of the plurality of thin plates, wherein the first side plate and the second side plate are supported by the retainer while being nipped between the retainer and a corresponding one of both side surfaces of the plurality of thin plates.

10. A turbine, comprising:
a rotor having a turbine blade; and
the seal device for a turbine according to claim 8 disposed around the rotor so as to separate an annular space around the rotor into a high-pressure space and a low-pressure space.

11. A seal device for a turbine disposed around a rotor so as to separate a high-pressure space and a low-pressure space, the seal device comprising:

a plurality of thin plates arranged in a multilayer fashion along an outer peripheral surface of the rotor, each of the thin plates having a thin-plate tip surface facing the outer peripheral surface of the rotor;

a first side plate disposed so as to face the high-pressure space and covering outer peripheral regions of first side surfaces, on a side of the high-pressure space, of the plurality of thin plates; and a second side plate disposed so as to face the low-pressure space and covering outer peripheral regions of second side surfaces, on a side of the low-pressure space, of the plurality of thin plates, wherein the first side surface of each of the thin plates is covered with the first side plate in a region extending further to an inner side, in a radial direction of the rotor, than a region of the second side surface covered with the second side plate, and wherein the thin plates arranged in the multilayer fashion along the outer peripheral surface of the rotor have the same shape in which:

a radial-directional position of the thin-plate tip surface of each of the thin plates has a distribution such that the side of the high-pressure space is farther away from the outer peripheral surface of the rotor than the side of the low-pressure space in at least a partial range of the thin-plate tip surface in an axial direction of the rotor, and the radial-directional position of the thin-plate tip surface at an axial-directional position closest to the high-pressure space is positioned radially inward with respect to an inner peripheral edge of the first side plate; and, the thin-plate tip surface of each of the thin plates has:
a distribution such that a first radial distance between the thin-plate tip surface and the outer peripheral surface of the rotor increases from the side of the low-pressure space toward the side of the high-pressure space in a first region, on the side of the high-pressure space in the axial direction of the rotor, of the thin-plate tip surface; and a distribution such that a second radial distance between the thin-plate tip surface and the outer peripheral surface of the rotor increases from the side of the high-pressure space toward the side of the low-pressure space in a second region, on the side of the low-pressure space in the axial direction of the rotor, of the thin-plate tip surface.

12. The seal device for a turbine according to claim 11, wherein an expression $L_1 > L_2$ is satisfied, provided that $L_1$ is a length of the first region in the axial direction of the rotor and $L_2$ is a length of the second region in the axial direction of the rotor.

13. The seal device for a turbine according to claim 11, wherein the thin-plate tip surface of each of the thin plates is configured such that a length $D_1$ of the first region in the radial direction of the rotor is greater than a length $D_2$ of the second region in the radial direction of the rotor.

14. The seal device for a turbine according to claim 13, wherein an expression $D_1/L_1 > D_2/L_2$ is satisfied, provided that $L_1$ is a length of the first region in the axial direction of the rotor, and $L_2$ is a length of the second region in the axial direction of the rotor.

15. The seal device for a turbine according to claim 11, further comprising a retainer configured to hold a side of a root portion of the plurality of thin plates, wherein the first side plate and the second side plate are supported by the retainer while being nipped between the retainer and a corresponding one of both side surfaces of the plurality of thin plates.

16. A turbine, comprising:
a rotor having a turbine blade; and
the seal device for a turbine according to claim 11 disposed around the rotor so as to separate an annular space around the rotor into a high-pressure space and a low-pressure space.

* * * * *